United States Patent
Isaac et al.

[15] 3,701,021
[45] Oct. 24, 1972

[54] APPARATUS FOR TESTING CIRCUIT PACKAGES

[72] Inventors: George L. Isaac, Sunnyvale; Richard F. Kingsbury, San Jose; John G. Surak, Los Gatos, all of Calif.

[73] Assignee: Signetics Corporation, Sunnyvale, Calif.

[22] Filed: Nov. 27, 1970

[21] Appl. No.: 93,322

[52] U.S. Cl. .................................324/158 F, 209/73
[51] Int. Cl. ..........................G01r 31/22, B07c 5/344
[58] Field of Search.........324/158 F, 158 P, 158 R, 73 AT; 209/75, 73, 74

[56] References Cited

UNITED STATES PATENTS

| | | | |
|---|---|---|---|
| 3,363,179 | 1/1968 | McCutcheon | 324/158 F |
| 3,274,534 | 9/1966 | Shortridge | 324/158 P |
| 3,408,565 | 10/1968 | Frick et al. | 324/73 AT |

Primary Examiner—Rudolph V. Rolinec
Assistant Examiner—Ernest F. Karlsen
Attorney—Flehr, Hohbach, Test, Albritton & Herbert

[57] ABSTRACT

Apparatus for testing circuit packages including a test sequence generator which is connected to a contactor for making contact to the leads of a circuit package. The contactor includes an inclined track for slidably receiving integrated circuit packages, and circuit package storage tubes connected to the ends of the inclined track. The contactor has a test region at which a circuit package is held by a rocker member. Contact means having a plurality of fingers is operated to make contact with the leads of an integrated circuit package in the test region. A test sequence may then be conducted. After the test sequence the rocker member is operated to release the integrated circuit package which has just been tested from the test region. Another circuit package then moves into the test region and the testing sequence is initiated again.

7 Claims, 11 Drawing Figures

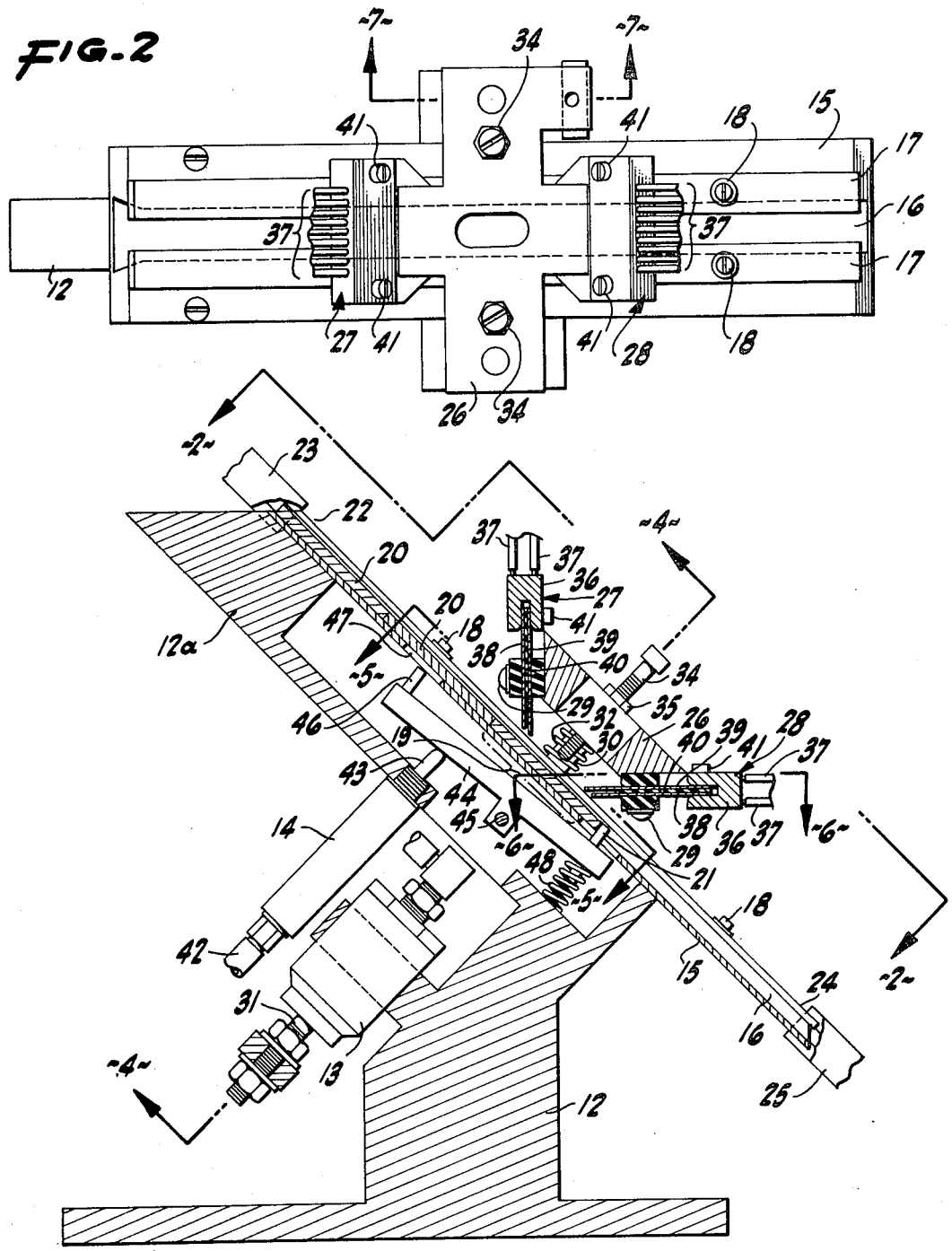

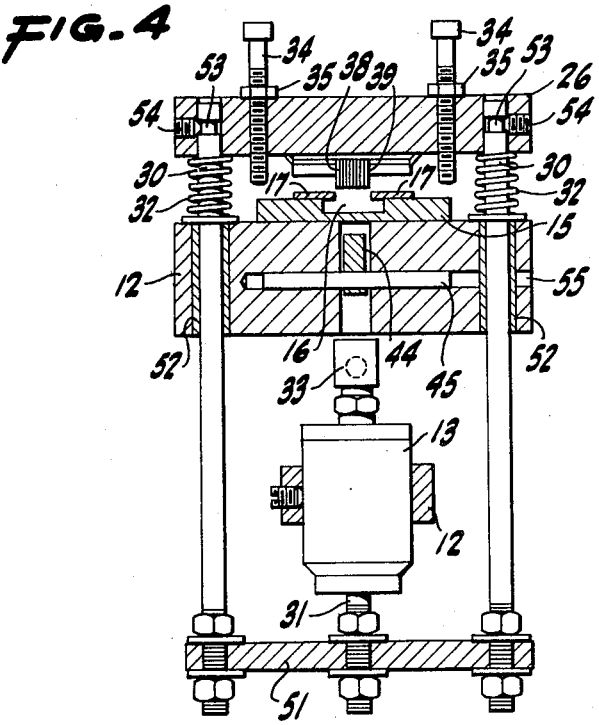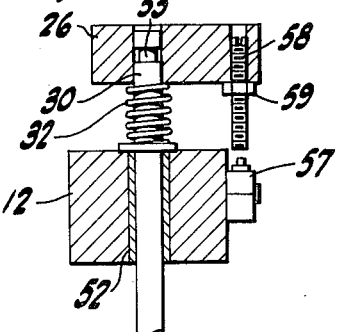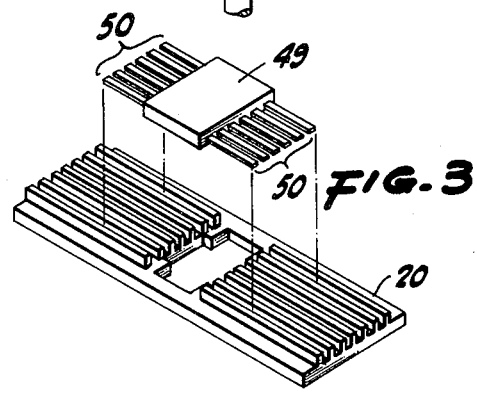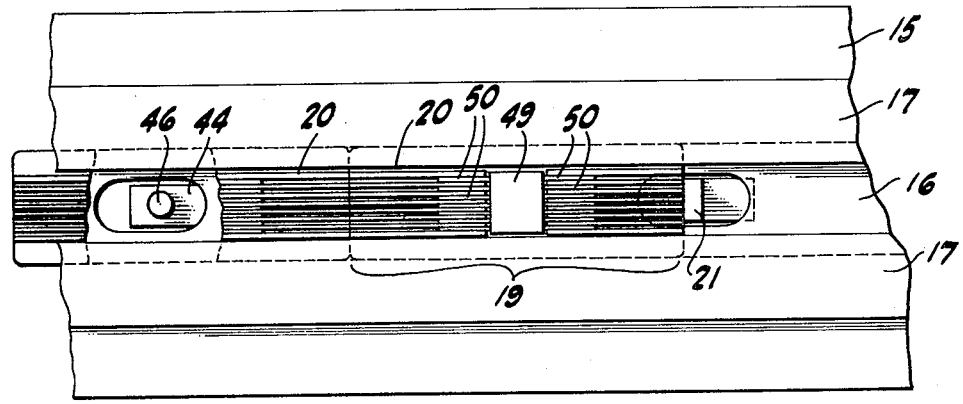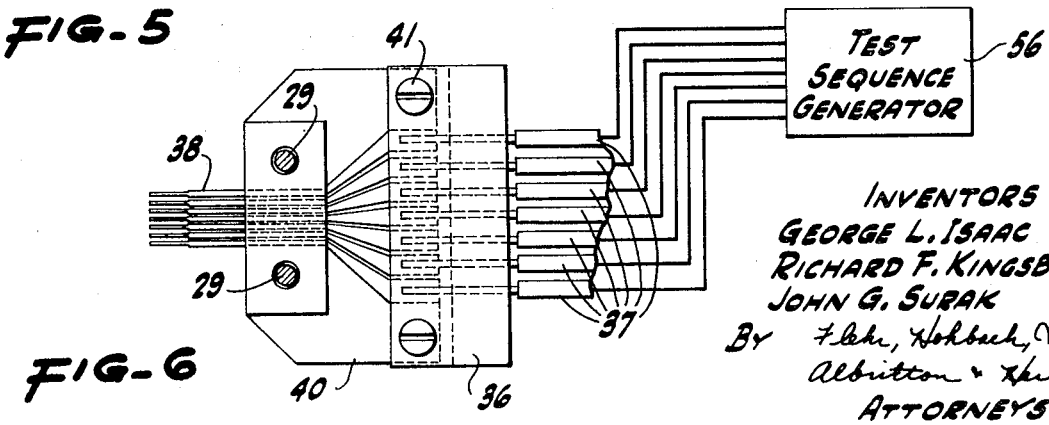

INVENTORS
GEORGE L. ISAAC
RICHARD F. KINGSBURY
JOHN G. SURAK
BY Flehr, Hohbach, Test,
Albritton & Herbert
ATTORNEYS INVENTORS
GEORGE L. ISAAC
RICHARD F. KINGSBURY
JOHN G. SURAK
BY Flehr, Hohbach, Vest,
Albritton & Herbert
ATTORNEYS

APPARATUS FOR TESTING CIRCUIT PACKAGES

BACKGROUND OF THE INVENTION

This invention pertains to apparatus for the testing of integrated circuit and more particularly relates to an automatic contactor for facilitating testing of the electrical properties of a circuit package.

The use of integrated circuits has mushroomed since their introduction. However, the small size of integrated circuits and their sensitivity to electrical disturbances present manufacturing and handling problems. Although the manufacturing "yield" of usable integrated circuits has been steadily increased as new and better manufacturing methods have been developed, it is still desirable to test all or at least a significant portion of the integrated circuits which are produced in order to verify that they exhibit the proper electrical characteristics for the uses for which they are intended. An efficient way of testing the circuit packages is by connecting their leads to a small computer or test sequence generator which is programmed to run through a series of tests such as applying voltages to certain terminals and observing outputs on other terminals.

Because of their small size and the great number of circuit packages which need to be tested it is imperative that an automated system be provided for connecting the circuit package leads to the computer or test sequence generator for testing. In addition, care must be exercised to insure that no electrical signals or fields are generated by the automated handling equipment that might interfere with or have a deleterious affect on the testing sequence.

SUMMARY OF THE INVENTION

Accordingly, it is an object of this invention to provide apparatus for sequentially and automatically making contact to integrated circuit packages.

It is another object of this invention to provide apparatus for automatically connecting a test sequence generator to leads of a circuit package.

It is another object of this invention to provide a pneumatically operated contactor for contacting the leads of integrated circuit packages.

Briefly, in accordance with one embodiment of the invention an electrical tester is connected to contactor connections of a contactor. The contactor has a track adapted to slidably receive a plurality of circuit packages and has a test region to which the circuit packages are sequentially fed. The track also has a rocker member for holding a circuit package in the test region. Contact means is provided which has a plurality of contact fingers. The contact means is movable between an engaged and a disengaged position with respect to the test region whereby the contact fingers make contact with the leads of the integrated circuit package in the test region when the contact means is in the engaged position. The contact fingers are connected to the contactor connections and thus to the tester so that a test a test sequence may be applied to an integrated circuit package in the test position. Means is provided for moving the contact means between the engaged and disengaged positions and means is also provided for operating the rocker member. In this manner a circuit package is released from the test region after a test sequence and the next of the plurality of the circuit packages moves to the test region.

BRIEF DESCRIPTION OF THE DRAWINGS

FIG. 1 is a side elevation partly in cross section of a contactor for testing circuit packages in accordance with this invention.

FIG. 2 is an elevation of the contactor of FIG. 1 taken along the line 2—2 of FIG. 1.

FIG. 3 is an isometric view showing one form of circuit package and a carrier in which the circuit package is mounted.

FIG. 4 is a sectional view of the contactor of FIG. 1 taken along the line 4—4 in FIG. 1.

FIG. 5 is a detail view of a portion of the track of the contactor of FIG. 1 taken along the line 5—5 of FIG. 1.

FIG. 6 is a detail of a portion of the contactor of FIG. 1 taken along the line 6—6 in FIG. 1.

FIG. 7 is a detail of the contact finger block holder shown in FIG. 2 taken along the line 7—7.

DESCRIPTION OF THE PREFERRED EMBODIMENTS

Figure 10:
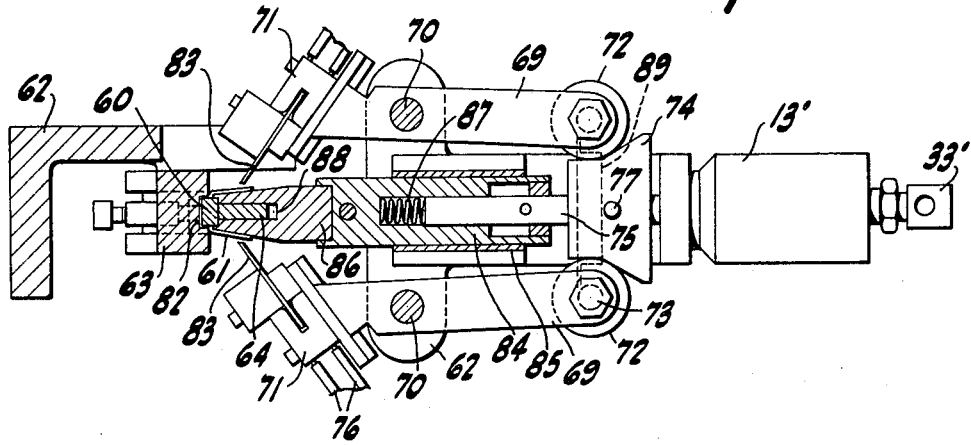
FIG. 10 is another view of the contact finger actuating assembly of the contactor of FIG. 8.

The contactor comprising the present invention consists of a base 12 to which is mounted a contactor operating air cylinder 13 and an escapement operating air cylinder 14. The base 12 has an inclined portion 12a which mounts a track 15 which is inclined at a substantial angle with respect to the horizontal and vertical region 19. The track 15 has a groove 16 and guide rails 17 which are mounted to the track 15 by screws 18. The track 15 has a test region generally indicated by reference numeral 19. The groove 16 in track 15 is adapted to receive in end-to-end relation a plurality of circuit packages 20. The track 15 is inclined so that the circuit packages slide down the enclosure defined by the groove 16 and guide rail 17 until the bottommost circuit package arrives at test region 19b and is held there by a stop 21. As shown in FIG. 1 the track 15 has an upper region generally indicated by reference numeral 24 to which a circuit package storage tube 23 may be attached and a lower region generally indicated by reference numeral 24 to which a circuit package storage tube 25 may be attached and the test region 19 is intermediate the upper and lower regions. Suitable circuit package storage tubes are well known in the art and may, for example, be similar to those described in U.S. Pat. No. 3,435,949. In accordance with this invention, the test region 19 is intermediate the upper and lower regions of the track 15 so that there is gravity feed of integrated circuit packages both into and out of the test region 19.

Contact means comprising a contact finger block holder 26 has two contact finger blocks 27 and 28 mounted thereto by screws 29. The contactor finger block holder 26 is mounted in spaced relation above the test position 19 by sliding shafts 30 which are attached to an operating shaft 31 of the air cylinder 13 as will more fully appear hereinafter. A spring 32 surrounds each of the sliding shafts 30 for normally holding the contact finger block holder 26 in a disengaged position as shown in FIG. 1. When the air cylinder 13 is actuated through its pneumatic input 33 the operating shaft 31 moves downward and carries the contact finger block holder 26 downward also to an engaged position. An adjustable stop screw 34 having a jamb nut 35 on the contact finger block holder 26 is adapted to abut the track 15 so as to limit the downward movement of the contact finger block holder 26. Each of the contact finger blocks 27 and 28 comprise an insulated connector block 36 having a plurality of connections 37. The connections 37 connect the contactor block 36 to a test sequence generator as is more fully discussed hereinafter. Each connector block 36 mounts two rows of contact fingers 38 and 39 which are separated by an insulating strip 40. These are mounted to the connector blocks 36 by screws 41.

When the air cylinder 13 is operated so that the contact finger block 26 together with contact finger blocks 27 and 28 are moved to the engaged position, the contact fingers 38 and 39 are in contact with leads of the circuit package 20 which is disposed in the test region 19. A test sequence generator then applies signals to the circuit package 20 via connectors 37 and performance of the circuit package is also sensed over the connector 37.

In accordance with the invention the contact finger blocks 27 and 28 are oriented at approximately 45° with respect to the track 15. With this orientation the contact fingers 38 and 39 make contact with the leads of the integrated circuit package at approximately 45° also. This 45° orientation produces equal components of contact force both in the plane of the integrated circuit package leads and normal to the plane of the leads. This produces a "scrubbing" action which breaks through oxides or films which might be present on the leads and insures a good electrical contact between the contact fingers and leads.

By having two rows of contact fingers 38 and 39, each of the leads of a circuit package 20 is contacted by two contact fingers. The purpose of this duplication is to minimize the effect of contact resistance while various parameters of the circuit package are being checked. This arrangement is shown in the art and is known as Kelvin contacts. One contact finger is referred to as power and one contact finger is referred to as sense. When utilized in conjunction with a Kelvin bridge errors due to contact resistance are minimized. Continuity between duplicate contact fingers may also serve as an indication that good electrical contact is being made with a circuit package lead.

After the test sequence has been completed the air cylinder 31 is deactuated so that the contact finger block holder 26 and contact finger block 27 and 28 are moved to the disengaged position shown in FIG. 1. Then air cylinder 14 is actuated through its pneumatic input 42 so that its shaft 43 pulses upward against a rocker member 44 which is rotated about a pivot point 45. Rotation of the rocker member 44 about pivot point 45 withdraws stop 21 which is part of rocker member 44 from in front of the circuit package 20 which is in the test region 19 and to which the test sequence has just been applied. This allows the circuit package to slide down the track through the lower region 24 and into the circuit package storage tube 25. At the same time it is necessary that the circuit package adjacent the test region 19 be prevented from sliding down the track until the stop 21 is again in position so that it will come to rest in the test region 19. Means are provided for holding this adjacent circuit package in position in the form of a protrusion 46 which is attached to the rocker member 44. When the rocker member 44 rotates above the pivot point 45 so that stop 41 is withdrawing from the track the protrusion 46 extends through an aperture 47 in the track against the adjacent circuit package 20 and holds this adjacent circuit package against the guide rails 17 so that it is prevented from moving down the track. When the air cylinder 14 is deactuated so that its shaft 43 is withdrawn the rocker member 44 is forced by spring action of the spring 48 to return to the position shown in FIG. 1. In this position the stop 21 is again in position and the protrusion 46 releases the adjacent circuit package 20 so that is may slide down to the test region 19.

Referring to FIG. 3 there is shown a pictorial representation of what has thus far been referred to as the circuit packages 20. Actually, the apparatus as shown and described in connection with FIGS. 1 and 2 is adapted to make contact to and initiate a test sequence of an integrated circuit 49 having a plurality of leads 50 which may be carried in a circuit package holder 20.

FIG. 4 is a sectional view of the contactor apparatus of FIG. 1 taken along the line 4—4 in FIG. 1 and more clearly illustrated the relationship between the air cylinder 13 and the contact finger block holder 26. The shaft 31 of air cylinder 13 rigidly mounts a generally rectangular member 51. The sliding shafts 30 are also rigidly mounted to the generally rectangular member 51. The sliding shafts 30 extend through bushings 52 mounted in the base 12 and through the springs 32 and have necked portions 53. The contact finger block holder 26 is rigidly attached to the necked portions 53 of the shafts 30 by set screws 54. As can be seen in FIG. 5 the pivot 45 of the escapement 44 may consist of, for example, drill rod inserted in a blind hole 55 in the base 12.

In operation, a circuit package 20 which is really a circuit holder for a circuit 49 having a plurality of leads 50 is slidably received in the enclosure formed by groove 16 and track 15 and the track guide 17. One circuit package 20 is present in the test region 19 and abuts the stop 21 of the escapement 44. Adjacent to this circuit package and extending through the upper region 22 are a plurality of other integrated circuit packages 20 in an aligned row along track 15. When the rocker member 44 is pivoted the stop 21 is moved out of the way of the circuit package 20 in the test region 19 and this circuit package slides down the enclosure defined by the groove 16 and track 15 in the guide rail 17. At the same time the protrusion 46 on rocker member 44 is brought to bear against the adjacent circuit package 20 and urges this circuit package against the guide rail 17 so as to prevent this adjacent circuit package and the other in the aligned row from also sliding down the enclosure while the stop 21 is withdrawn. When the rocker member 44 pivots back to its original position the stop 21 again appears in the groove 16; the protrusion 46 is withdrawn from the adjacent circuit package 20 and this adjacent circuit package 20 slides down into the test region 19.

Referring now to FIG. 6, there is shown a detailed elevational view of the contact finger block 28 taken along the line 6—6 in FIG. 1. The connector block 36 has a plurality of connections 37 which terminate in contact fingers 38. These connections 37 connect the fingers 38 with a test sequence generator 55. The contact fingers 38 as discussed before are adapted to contact leads of a circuit package and the test sequence generator 56 is adapted to perform a plurality of tests on the circuit package by applying certain signals and observing certain outputs from the circuit package.

As shown in FIG. 7 the contact finger block holder 26 is mounted on a shaft 30 which is adapted to slide through bushings 52 of the base 12. The diagram of FIG. 7 shows the relationship between the contact finger block holder 26 and the base 12 when the air cylinder 13 is not operated and the contact finger block holder 26 is in the disengaged position. As discussed before, when the air cylinder 13 is operated the contact finger block holder 26 is drawn towards the base 12. A microswitch 57 is fixedly mounted on the base 12 in the manner shown in FIG. 7. A screw 58 is threaded into the contact finger block holder 26 and is adjustable therein and has a jamb nut 59 for locking the screw 58 in a desired position. When the contact finger block holder 26 moves to an engaged position the screw 58 is carried by the contact finger block holder 26 and actuates the microswitch 57. The microswitch 57 may be connected to a test sequence generator for informing the test sequence generator that the contact finger block holder is in the engaged position. With the contact finger block holder 26 in the engaged position the contact fingers are in contact with the leads of a circuit package and the test sequence may begin.

Figure 8:
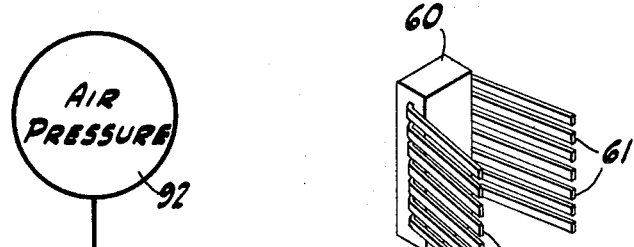
FIG. 8 is a pictorial view of another form of circuit package which the contactor of FIG. 8 is adapted to test.

What has been described thus far is apparatus for making contact to the leads of and testing a particular embodiment of a circuit package as was shown and described in connection with FIG. 3. As those skilled in the circuit package art will appreciate, circuit packages do not come in only one size and one configuration. Rather, all sizes of circuit packages are produced and the various circuit packages may have differing lead configurations. I.e. some may have 10 leads, 12 leads, 14 leads, etc. This invention pertains to the contacting and testing of all circuit packages and it is obvious to those skilled in the art that certain minor changes should be made in the track and contact finger configuration to accommodate the particular circuit packages which it is desired to contact and test. One such circuit package which it might be desired to test, is illustrated in FIG. 8. This circuit package 60 has a plurality of bent leads 61. Often in the manufacture of circuit packages it is required that the leads be bent and it is desirable in some instances to bend the leads before the circuit package is tested.

Figure 9:
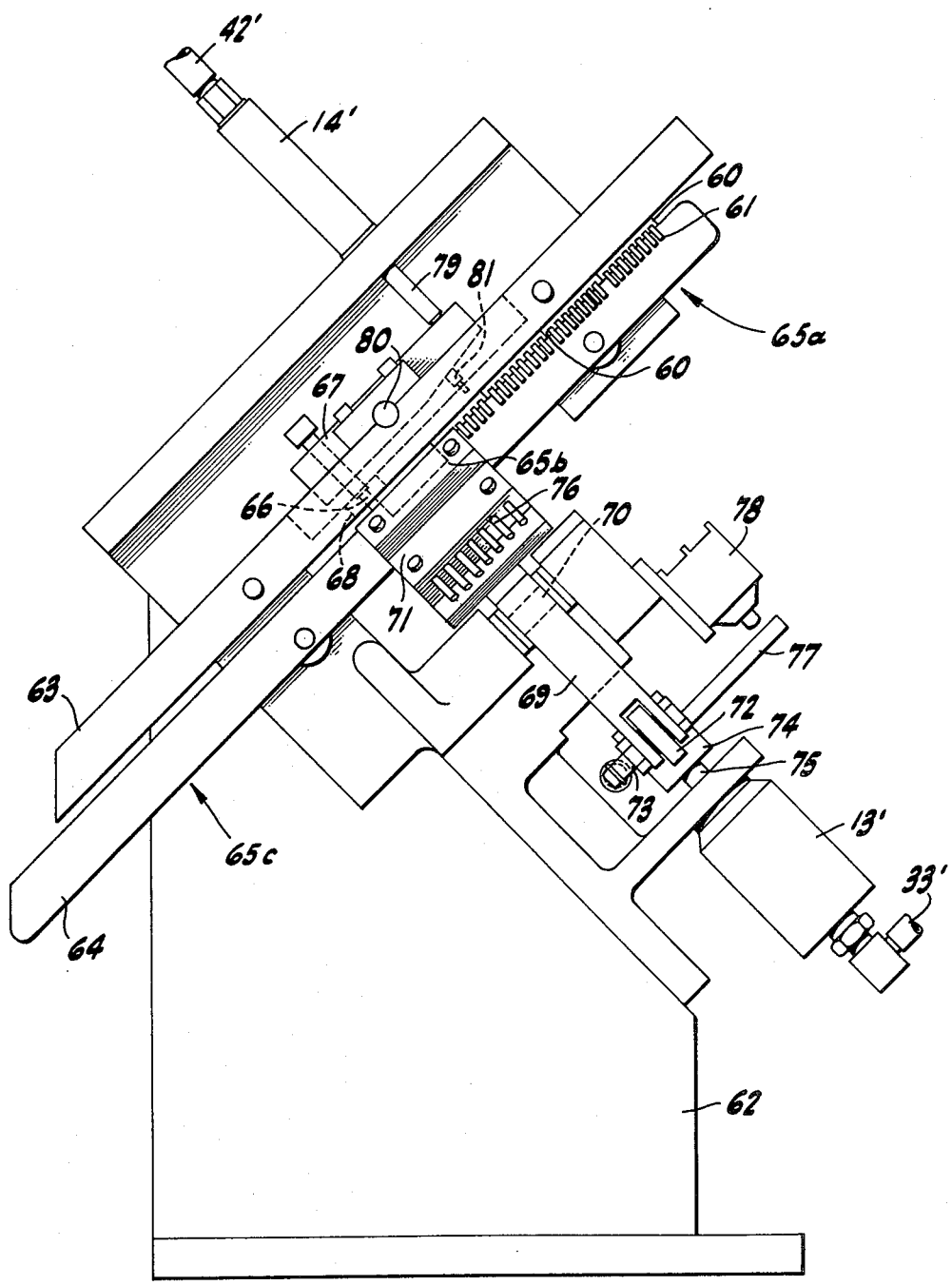
FIG. 9 is a side elevational view similar to FIG. 1 and showing another embodiment of a contactor for testing the circuit packages illustrated in FIG. 8.

FIG. 9 is a side elevation view of apparatus for contacting and testing the circuit package having bent leads as was illustrated in FIG. 8. The apparatus of FIG. 9 comprises a base 62 to which is attached an air cylinder 13' having a pneumatic inlet 33'. An air cylinder 14' having a pneumatic inlet 42' is also attached to the base 62. A two section track having an upper section 63 and a lower section 64 is also affixed to the base 62 and is adapted to slidably receive a plurality of circuit packages 60 each having a plurality of bent leads 61. The track sections 63 and 64 are inclined with respect to the horizontal and vertical such that the circuit packages 60 slide down the track section 63 and 64 until the first circuit package reaches a test region generally indicated by reference numeral 65b and abuts against a stop 66. The test region 65b is intermediate an upper portion 65a and a lower portion 64c of the track. The stop 66 is attached to a rocker member 67 and extends through an aperture 68 in the track section 63 to prevent the circuit packages from sliding beyond the test region 65. A pair of lever arms 69 are mounted for rotation about the pivot 70, which are mounted in a portion of the base 62. A pair of contact finger blocks 71 are mounted respectively on the pair of lever arms 69. Each of the lever arms 69 also has a roller 72 mounted for free rotation with respect thereto by a shaft 73. The rollers 72 bear against a cam block 74 which is rigidly fixed to the actuating shaft 75 of the air cylinder 13'. Each of the contact finger blocks 71 has a plurality of connections 76 which extend to a test sequence generator. These connections are electrically connected to a plurality of contact fingers carried by each of the contact finger blocks 71. These contact fingers are not shown in FIG. 9 but are adapted upon actuation of the air cylinder 13' to be moved into electrical contact with the plurality of leads 61 of a contact package 60 which is present in the test position 65b. When the air cylinder 13' is actuated a protrusion 77 carried by the cam block 74 is adapted to contact and actuate a microswitch 78 which is carried by the base 62. This microswitch 78 is connected to a test sequence generator (not shown in FIG. 9) and actuation of the microswitch 78 and informs the test sequence generator that the contact fingers of the contact finger blocks 71 are in contact with the leads 61 of a circuit package 60 in the test region 65b and that a test sequence may be initiated.

After completion of a test sequence the air cylinder 13' is deactuated to move the contact finger blocks 71 to a disengaged position. Then the air cylinder 14' which has an actuating shaft 79 is actuated. Actuation of the shaft 79 causes the rocker member 67 to rotate about the pivot 80. This rotation withdraws the stop 66 from in front of the contact package 60 in the test region 65b and this circuit package is free to slide on down through the lower region 65c. In order to prevent adjacent circuit packages in the upper region 65a from also sliding down through the test region 65b without stopping at the test region a protrusion 81 is also provided on the rocker member 67. When the rocker member 67 rotates this protrusion 81 is brought to bear against the circuit package adjacent the test region 65b and holds this circuit package (along with the other circuit packages in the aligned row) against the track section 64. Then when the air cylinder 14' is deactuated so that the rocker member 67 returns to its original position with the stop 66 blocking the path along the track sections 63 and 64, the protrusion 81 releases this adjacent contact package so that it may slide down into the test region 65. Then the air cylinder 13' is again actuated with this whole process repeating itself.

Referring now to FIG. 10 there is shown more clearly that portion of the apparatus of FIG. 9 for contacting the leads 61 of integrated circuit package 60. The track section 63 has a groove 82 formed therein such that the circuit packages 60 fit in the groove and are adapted to slide along it. The track section 64 serves to retain the circuit packages 60 in this groove. The shaft 75 of air cylinders 13' has the cam block 74 mounted thereon and this shaft 75 also extends into and is slidably received by the interior of a member 84. The member 84 is mounted by a bushing 85 in a portion of the base 62 and is adapted to slide back and forth in the bushing 85. The member 84 also has a guide piece 86 rigidly attached thereto. The shaft 75 extends into the member 84 and is coupled therewith by means of a spring 87. As shown in FIG. 10 each of the contact finger blocks 71 has a plurality of contact fingers 83 which are adapted to move in a horizontal plane to contact the plurality of leads 61 of a circuit package 60 when the air cylinder 13' is actuated.

When the air cylinder 13' is actuated the sequence of events is as follows. The actuating shaft 75 is actuated which, through the coupling of spring 87 with the member 84, urges the member 84 and its attached guide piece 86 toward the track sections 63 and 64. A recess 88 in the guide piece 86 permits the guide piece 86 to surround the track section 64 and extend between the track section 64 and the plurality of leads 61 of integrated circuit package 60. Thus the guide piece 86 functions as a support for the plurality of leads 61 so that they may be firmly contacted by the contact fingers 83. Further, the positioning of the guide piece 86 between the track 64 and the plurality of bend leads 61 serves to spread the bent leads 61 to a proper angle.

At the same time that the member 84 and its guide piece 86 are being moved toward the track sections 63 and 64 the cam block 74 which is attached to the shaft 75 is also being moved towards the track section 63 and 64. This movement is translated by rollers 72 to rotation of the lever arms 64 about the pivots 70. This rotation causes the contact fingers 83, which are carried by the contact finger blocks 71, to move in a horizontal plane to engage and bear against the plurality of leads 61 of circuit package 60. Thereafter a test sequence may be applied to the contacts 61 through the contact fingers 83 by the connections 76 which may be connected to a test sequence generator. After all testing has been completed the air cylinder 13' is deactuated so that the lever arms 69 are rotated back to their original position, removing the contact fingers 83 from contact with bend leads 61. A spring 89 extends between the shafts 73 of the rollers 72 and functions to cause this rotation of the lever arms 69 back to their original position. At the same time the guide piece 86 is withdrawn from between the bent leads 61 and the track section 64 through the coupling of the member 84 with the shaft 75 by means of the spring 87.

Figure 11:
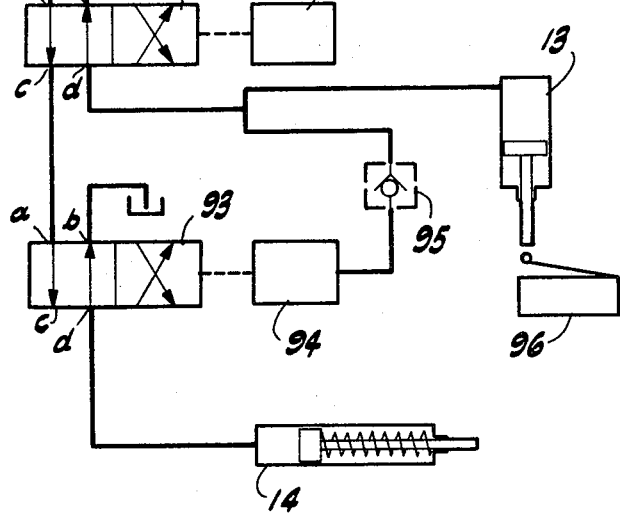
FIG. 11 is a pneumatic circuit diagram of the pneumatic circuit of the contactor of FIG. 1.

A suitable pneumatic circuit for operating either the apparatus shown in FIG. 1 or the apparatus shown in FIG. 9 is logically illustrated in FIG. 11. Referring to FIG. 11 a four-way two-position foot-operated spring return valve 90 is provided which has ports a, b, c, and d. In the normal position port a of valve 90 is connected to port c, and port d is connected to port b. When, however, the foot pedal 91 is operated the valve 90 is switched so that port a is connected to port d and port c is connected to port b. A source of air pressure 92 is connected to port a of the valve 90. Port b of valve 90 exhausts to the atmosphere and port c of valve 90 is connected to port a of a four-way two-position spring return valve 93 which is similar to the valve 90. Valve 93 is adapted to be operated by a pilot 95 which logically is the same as the foot switch 91 except that "piloting" air is used to shift the valve 93 as more fully discussed hereinafter. Port d of valve 90 is connected to a contact finger block operating cylinder 13 and through a flow control valve 95 to the pilot 94. Port d of the valve 93 is connected to a rocker member operating cylinder 14. Also shown in the logical diagram of FIG. 11 is a microswitch 96. Microswitch 96 is actuated by actuation of the air cylinder 13 and informs a test sequence generator (not shown) that this air cylinder 13 is operated and that a testing sequence may begin.

Depression of the foot pedal 91 causes the valve 90 to shift so that air pressure is supplied to the contact finger block operating cylinder 13. The pilot 94 is also energized through the flow control valve 95 to operate the valve 93. Since, however, valve 90 is also operated there is no air pressure output at port d thereof so that the rocker member operating cylinder 14 is not operated. As discussed before, motion of the air cylinder 13 actuates the micro switch 96 which initiates a testing sequence. After this test has been completed pressure is removed from the foot pedal 91 and the valve 90 switches back to its original position which retracts the contact finger block associated with the air cylinder 13. The valve 93 then suddenly sees air pressure at its input port a. This energizes the air cylinder 14 which operates a rocker member such that the test circuit package falls away from the test region. Then the pilot 94 starts to bleed through the flow control valve 95 after which the valve 93 returns to its original rest position. This de-energizes the rocker cylinder 14, allowing the next circuit package to fall into the test region.

We claim:

1. In contactor apparatus for testing integrated circuit packages of the type having a plurality of leads by use of an electrical tester which generates a test sequence, an inclined track structure mounted on the base, said base being formed to provide a track which has an upper region, a lower region and an intermediate test region intermediate the upper and lower regions, said track being formed to slidably receive a plurality of integrated circuit packages arranged one after the other in an aligned row, said track being inclined so that said integrated circuit packages will travel sequentially one by one under the force of gravity through said upper, intermediate and lower regions, a rocker member carried by the track structure and movable between first and second positions with respect to said track for releasably engaging and holding each of the integrated circuit packages one by one in the test region, said rocker member including a stop which is adapted to engage and hold an integrated circuit package in the test region and prevent further travel in the track of all succeeding integrated circuit packages when said rocker member is in said first position, said rocker member including a protrusion which in the second position of said rocker member is adapted to engage the next succeeding integrated circuit package following the integrated circuit package in the test region to retain it and the following integrated circuit packages when the integrated circuit package in the test region is released; contact means having a plurality of contact fingers, operative means for moving said contact means so that said contact fingers are moved between engaged and disengaged positions with respect to the leads of an integrated circuit package held in said test region, and further operative means for causing said rocker member to momentarily move from said first to said second position to release an integrated circuit package after it has been disengaged by the contact fingers and to permit it to travel down the track through the lower region and to engage and hold the next succeeding integrated circuit package.

2. Contactor apparatus as in claim 1 together with first and second storage tubes for carrying integrated circuit packages in rows with one integrated circuit package behind another, said track structure including means at each end of the track mating with one of said tubes whereby said first tube is mounted on the upper end of the track structure and said second tube is mounted on the lower end of the track structure with the tubes in axial alignment with the track so that integrated circuit packages are gravity fed directly from the first storage tube into said track through said test region and from said track directly into the second storage tube.

3. Contactor apparatus as in claim 1 wherein said track includes first and second apertures adjacent either side of said test region, respectively said rocker member including a stop adapted to extend through said first aperture in the first position of the rocker member and engage and hold an integrated circuit package in the test region and prevent further travel in the track of all succeeding integrated circuit packages said rocker member also including a protrusion adapted to extend through said second aperture in the second position of the rocker member and engage the next succeeding integrated circuit package following the integrated circuit packages when the integrated circuit package in the test region is released, spring means yieldably urging said rocker member to the first position of said rocker member, and actuating means for moving said rocker member to the second position.

4. In contactor apparatus for testing integrated circuit packages of the type having a plurality of leads by use of an electrical tester which generates a test sequence, a base, a track structure mounted on said base and forming a track having an axis which is inclined from the vertical and the horizontal at a substantial angle, said track being formed so that it is adapted to slidably receive a plurality of integrated circuit packages whereby the integrated circuit packages are aligned in a row one behind the other, said track having an upper region, a lower region and an intermediate test region intermediate said upper and lower regions, said track being inclined at an angle so that said integrated circuit packages are gravity fed one by one through said upper region through said test region and then through said lower region, a rocker member movable between first and second positions with respect to said track, said rocker member including a stop which in the first position of said rocker member is adapted to engage and hold an integrated circuit package in the test region and to prevent further travel in the track of all succeeding integrated circuit packages, said rocker member including a protrusion which in the second position of said rocker member is adapted to engage the next succeeding integrated circuit package following the integrated circuit package in the test region to retain it and the following integrated circuit packages when the integrated circuit package in the test region is released, contact means mounted on said base in spaced relationship to said track and having a plurality of contact fingers, operative means for moving said contact means so that said contact fingers are moved between engaged and disengaged positions with respect to the leads of an integrated circuit package held in said test region, means for momentarily actuating said rocker member to the second position whereby an integrated circuit package after it has been disengaged by the contact fingers is released to travel down the track through the lower region, but said protrusion engages the next succeeding integrated circuit package following the integrated circuit package in the test region to retain it and the following integrated circuit packages when the integrated circuit packages in the test region is released, spring means for yieldably urging said rocker member to the first position whereby the next succeeding integrated circuit package is then held in the test region.

5. Contactor apparatus as in claim 4 wherein said track comprises a grooved member and a guide member for retaining integrated circuit packages therebetween, said grooved member having a first aperture between the test region and the lower region of said track through which said stop portion of said rocker member is adapted to extend when said rocker member is in the first position, said grooved member having a second aperture in said rocker member is adapted to extend when said rocker member is in said second position.

6. Contactor apparatus as in claim 5 for contacting integrated circuit packages of the type having a plurality of straight leads wherein said contact includes two contact finger blocks, each contact finger block having a plurality of fingers extending along the axis of said track and adapted to move in a vertical plane to engage the plurality of leads of an integrated circuit package in said test region when said contact means is moved to an engaged position.

7. Contactor apparatus as in claim 5 for contacting integrated circuit packages of the type having a plurality of bent leads wherein said contact means includes two contact finger blocks, each contact finger block having a plurality of fingers extending in a plane perpendicular to the axis of said track and adapted to move in a horizontal plane to engage the plurality of leads of an integrated circuit package in said test region where said contact means is moved to an engaged position.

* * * * *